N. A. DEDERER.
Harvester Rake.
No. 52,396. Patented Feb. 6, 1866.
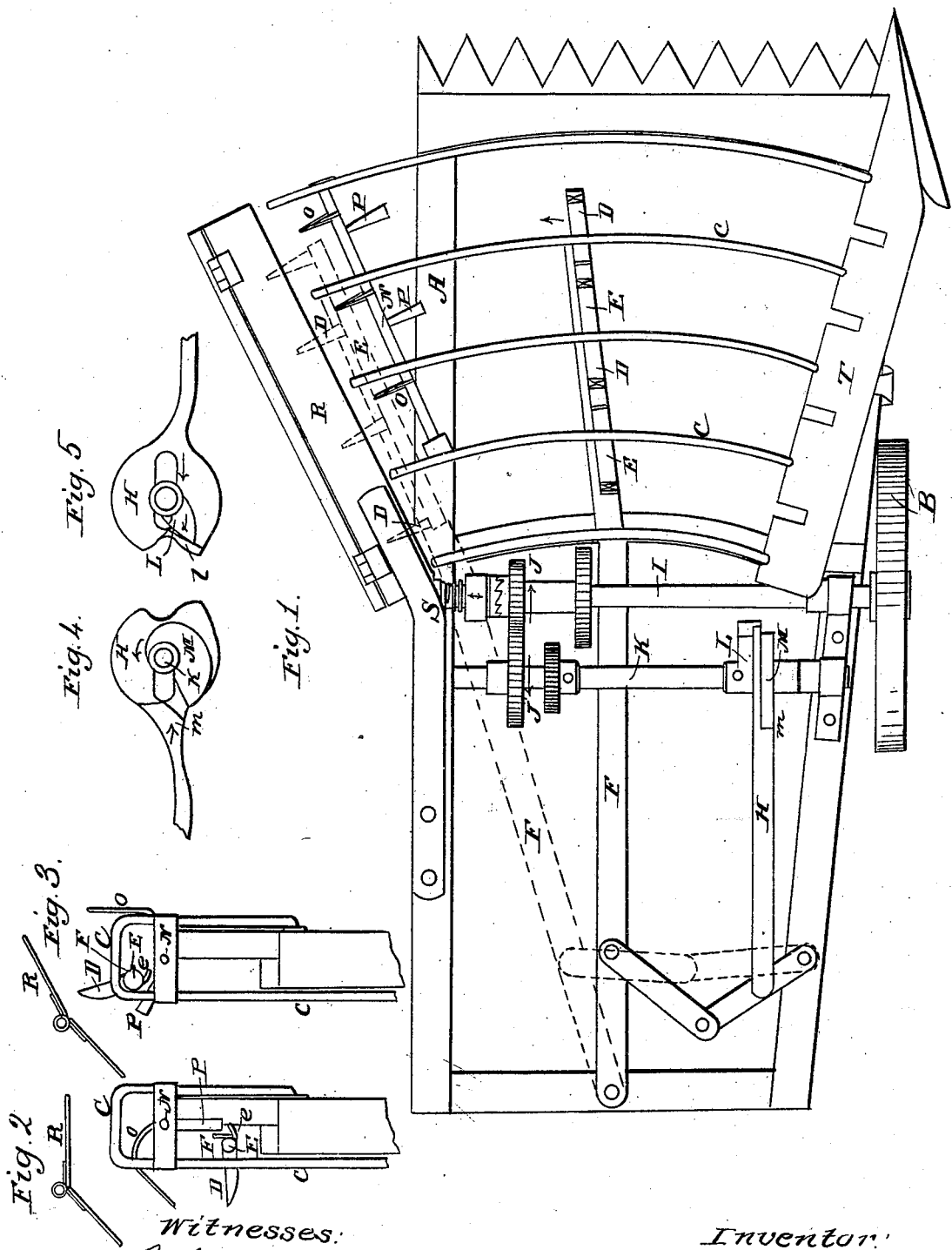
Witnesses:
G. Hase
J. J. Peyton
Inventor:
N. A. Dederer

UNITED STATES PATENT OFFICE.

NICHOLAS A. DEDERER, OF GREENE, NEW YORK.

IMPROVEMENT IN HARVESTER-RAKES.

Specification forming part of Letters Patent No. 52,396, dated February 6, 1866.

*To all whom it may concern:*

Be it known that I, NICHOLAS A. DEDERER, of Greene, in the county of Chenango and State of New York, have invented a new and useful Improvement in Harvester-Rakes, of which the following is a full, clear, and exact description, reference being had to the accompanying drawings, which make part of this specification, and in which—

Figure 1 represents a plan or top view of so much of a harvester embracing my improvement as is necessary to illustrate my invention, the black lines showing the position of the mechanism during the forward stroke of the rake, and the blue lines their position just after discharging the gavel. Fig. 2 represents a view in elevation of the dumping-cradle and shield while the gavel is being compressed. Fig. 3 represents a similar view of the same with the gavel discharged. Figs. 4 and 5 represent views of the pitman and driving-cams.

In the accompanying drawings, which exemplify one mode of carrying out my invention, my improved rake is shown as mounted in a stout frame, A, supported upon a grain-wheel, B, and upon one or more driving-wheels. Not shown in the drawings. The platform in this instance is shown as composed of rods, slats, or bars C, arranged parallel to each other, but sufficiently far apart to leave room for the traverse of the rake-teeth. The slats C on the grain side extend beyond the frame A, those in front being longer than the others.

The rake-teeth D are inserted in a swiveling head or rock-shaft, E, secured to the vibrating arm or lever F by loops which allow it a free axial movement. The teeth can be turned down in any direction, so as to pass beneath the surface of the platform on the retrograde stroke of the rake, but are held rigidly upright on the forward stroke by a stop, $e$, on the rake-head.

The arm F is pivoted at its rear end to the frame and vibrated by a toggle-joint lever, G, pivoted to a pitman, H. The rake is shown, in this instance, as driven from the grain-wheel B, the axle I of which carries a spur-wheel, J, driving a corresponding pinion, J′, on a countershaft, K. Cams or wipers L M on this countershaft alternately act upon flanges or studs $l\ m$ on the pitman H and vibrate the rake. The pitman is slotted, as shown in Figs. 4 and 5, to permit it to encircle and reciprocate upon the countershaft.

In order to insure the discharge of the gavel in a compact condition, I employ a dumping-cradle consisting of a horizontal rock-shaft, N, pivoted in suitable bearings in the frame, and armed with scythe-shaped teeth O, counterbalanced by levers P. In raking off, the rake-head slides over these levers, and by holding them down prevents the cradle from tilting while the gavel is being compressed.

In order to prevent the gavel from being scattered by being thrown too far, (which might occur from a sudden jerk to the machine,) I employ a shield, R, attached to an arm, S, projecting from the frame, and to prevent the shield from dragging a large gavel in passing over it I divide the shield horizontally into two parts, and hinge them together so as to allow the lower portion free play.

In Fig. 1 the rake is shown in black lines as having partially completed its forward stroke. The red arrows indicate the direction of the moving parts. As the rake passes under the grain-guard T on the divider side of the machine its teeth are erected by the toe $e$ coming in contact with a stop, $x$, on the frame. The cam L now acts upon the pitman H, and drives the rake swiftly across the platform, compressing the gavel into the dumping-cradle, the teeth of which prevent any portion from being prematurely shoved off, while the rake, in passing over the levers P, holds the cradle from tilting while the gavel is being compressed. The continued movement of the rake now tilts the cradle, depressing the teeth into the position shown in Fig. 1, and discharges the gavel, the cradle-teeth being stripped by the slats C, between which they pass. The rake-teeth are depressed by the toe $e$ sliding over the cradle-shaft N. The cam M now acts on the pitman and draws the rake slowly back with its teeth depressed, giving time for another gavel to accumulate upon the platform.

The speed of the rake can be varied by changing the relative sizes of the pinions J J′, as shown in the drawings. The dumping-cradle may be used with good effect without the shield. A platform with narrow slots may be used instead of the slats shown in the drawings. A ratchet, V, on the shaft I serves to prevent the rake from working when the machine is backing, and to connect and disconnect its gearing.

My machine is to be provided with a suitable frame, wheels, tongue, gearing, cutting apparatus, reel, and divider, which parts may be constructed in any approved way, as it is obvious these details may be varied without affecting my invention.

My rake might be driven from the driving instead of the grain wheel, if preferred.

What I claim as my invention, and desire to secure by Letters Patent, is—

1. The combination of the cams L M, toggle G, and pitman H with the vibrating rake-arm, substantially as described.

2. The combination of the vibrating rake, the slatted platform, and the compressing and dumping cradle, arranged and operating substantially in the manner described, for the purpose set forth.

3. The combination of the sweep-rake and dumping-cradle with the hinged shield, substantially as and for the purpose described.

4. The dumping-cradle, arranged and operating as described.

In testimony whereof I have hereunto subscribed my name.

N. A. DEDERER.

Witnesses:
WM. D. BALDWIN,
JOS. I. PEYTON.